United States Patent [19]

Reitel et al.

[11] 4,239,866

[45] Dec. 16, 1980

[54] CURABLE COATING COMPOSITION

[75] Inventors: Christian Reitel, Heidelberg; Lutz Goethlich, Limburgerhof, both of Fed. Rep. of Germany

[73] Assignee: BASF Aktiengesellschaft, Fed. Rep. of Germany

[21] Appl. No.: 42,564

[22] Filed: May 25, 1979

Related U.S. Application Data

[63] Continuation of Ser. No. 821,550, Aug. 3, 1977, abandoned.

[30] Foreign Application Priority Data

Aug. 13, 1976 [DE]  Fed. Rep. of Germany ....... 2636426
Aug. 13, 1976 [DE]  Fed. Rep. of Germany ....... 2636428

[51] Int. Cl.$^3$ .............................................. C08L 27/00
[52] U.S. Cl. ................................... 525/440; 525/455; 525/920; 560/164; 560/166; 204/159.14; 204/159.19; 204/159.15; 204/159.16
[58] Field of Search ................ 260/859; 560/164, 166; 525/440, 455, 920

[56] References Cited

U.S. PATENT DOCUMENTS

| | | | |
|---|---|---|---|
| 2,456,408 | 12/1948 | Greenlee | 260/410.5 |
| 2,484,487 | 10/1949 | Caldwell | 260/486 |
| 2,575,440 | 11/1951 | Bradley | 526/320 |
| 2,824,851 | 2/1958 | Hall | 528/93 |
| 3,598,866 | 8/1971 | Nowak | 564/164 |
| 3,627,819 | 12/1971 | Nowak | 560/166 |
| 3,726,886 | 4/1973 | Woo | 560/164 |
| 3,787,483 | 1/1974 | Woo | 560/166 |
| 3,871,908 | 3/1975 | Spoor | 260/859 R |

FOREIGN PATENT DOCUMENTS

| | | |
|---|---|---|
| 2050893 | 10/1970 | Fed. Rep. of Germany . |
| 2049715 | 4/1972 | Fed. Rep. of Germany . |
| 2064701 | 7/1972 | Fed. Rep. of Germany . |
| 2251933 | 5/1974 | Fed. Rep. of Germany . |
| 2358948 | 5/1975 | Fed. Rep. of Germany . |
| 1644797 | 9/1979 | Fed. Rep. of Germany . |

OTHER PUBLICATIONS

Gothlich, Lutz et al., Defazet, vol. 30, pp. 246–247, Jun./Jul., 1976.
Japan, Kokai 9,690, Chemical Abstracts, vol. 85, Abstract No. 44,248 e, (1975).
Kosar, Light Sensitive Systems, John Wiley & Sons, New York, (1965), pp. 158–193.
MXx Houben-Weyl, Methoden der Organischen X Chemie, vol. XIV/2, p. 57 et seq., (1963).

*Primary Examiner*—Paul Lieberman
*Attorney, Agent, or Firm*—Keil & Witherspoon

[57] ABSTRACT

Curable coating compositions which contain, as the binder, one or more olefinically unsaturated compounds containing urethane groups, with or without one or more olefinically unsaturated compounds copolymerizable therewith, in which the olefinically unsaturated compound containing urethane groups is a reaction product of vinyl isocyanate and a compound which contains at least one hydroxyl group and at least one radical of an ester of an $\alpha,\beta$-olefinically unsaturated carboxylic acid of 3 to 6 carbon atoms. The compositions may, for example, be used for the manufacture of coatings which can be cured with electron beams.

9 Claims, No Drawings

CURABLE COATING COMPOSITION

This is a continuation, of application Ser. No. 821,550 filed Aug. 3, 1977 now abandoned.

The present invention relates to a curable coating composition which contains, as the component forming the binder, a vinylurethane which has been obtained by reacting vinyl isocyanate with a compound which contains at least one free hydroxyl group and at least one radical of an ester of an $\alpha,\beta$-olefinically unsaturated carboxylic acid of 3 to 6 carbon atoms.

Coating compositions comprising solutions of high molecular weight or low molecular weight unsaturated compounds in vinyl monomers have been disclosed. If vinyl compounds which copolymerize rapidly, e.g. acrylic compounds, are used, such systems can be cured with high energy radiation. However, acrylic compounds have the disadvantage that they are, in general, toxic and cause severe irritation of the skin.

A process has also already been disclosed, in German Laid-Open Application DOS No. 20 64 701.2-43, for the manufacture of coatings by curing olefinically unsaturated polymeric materials containing urethane groups, these materials, with or without admixture of olefinically unsaturated monomeric compounds, being cured by means of ionizing rays; the olefinically unsaturated polymeric material containing urethane groups comprises at least two

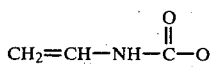

units and has been obtained by reacting hydroxylic oligomers or polymers of molecular weight from 500 to 10,000 with vinyl isocyanate. However, these products still require improvement in respect of reactivity and hardness.

It is an object of the present invention to provide coating compositions which represent further improvements in respect of these properties and in addition have the advantage that they can also be cured by means of ultraviolet radiation and peroxides and that they adhere well to a metallic substrate.

We have found, surprisingly, that this object can be achieved in an advantageous manner by providing the coating compositions according to the present invention.

The present invention relates to a curable coating composition which contains, as the component forming the binder, one or more olefinically unsaturated compounds (A) containing urethane groups, with or without one or more other olefinically unsaturated compounds (B) which are copolymerizable with (A) but differ from (A), in which the olefinically unsaturated compound (A) which contains urethane groups is a reaction product of vinyl isocyanate and a compound which contains at least one hydroxyl group and at least one radical of an ester of an $\alpha,\beta$-olefinically unsaturated carboxylic acid of 3 to 6 carbon atoms.

Component (A) may be a reaction product of an ester, containing at least one free hydroxyl group, of an $\alpha,\beta$-olefinically unsaturated carboxylic acid of 3 to 6 carbon atoms with vinyl isocyanate or may be a compound of the general formula

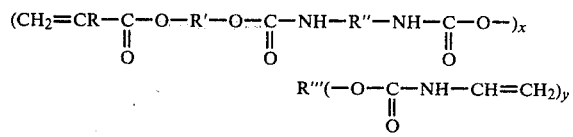

where x and y may be identical or different and each is a number from 1 to 5, R is hydrogen or methyl, R' is a divalent linear or branched radical of 2 to 16 carbon atoms which may or may not contain oxa groups, or is a divalent cycloaliphatic radical of 5 to 12 carbon atoms, R" is a divalent linear or branched aliphatic, cycloaliphatic or aromatic radical of 6 to 15 carbon atoms and R''' is a radical which is derived from a polyhydric alcohol, a polyether-ol or a polyester-ol and which has a valency corresponding to the sum of x+y.

The curable coating compositions of the invention have very advantageous processing properties and are in particular distinguished by their low viscosity and high reactivity.

The following details are to be noted with respect to the components from which the curable coating compositions of the invention are synthesized:

(A) Suitable esters of $\alpha,\beta$-olefinically unsaturated carboxylic acids of 3 to 6 carbon atoms, which esters contain one or more free hydroxyl groups and may be used to synthesize the vinylurethanes (A), are the esters of $\alpha,\beta$-olefinically unsaturated monocarboxylic acids, e.g. acrylic acid, methacrylic acid or $\alpha$-cyanoacrylic acid, with dihydric or polyhydric alcohols, e.g. linear, branched or cycloaliphatic diols or oxa-alkanediols of up to 12 carbon atoms, e.g. ethylene glycol, 1,2- and 1,3-propylene glycol, butane-1,4-diol, butane-1,3-diol and butane-1,2-diol, pentanediol, hexanediol, diethylene glycol, triethylene glycol, dipropylene glycol, dibutylene glycol and cyclohexanediol, triols, e.g. glycerol, trimethylolpropane and tris-(hydroxyethyl) isocyanurate, and alcohols of higher functionality, e.g. pentaerythritol, dipentaerythritol, sorbitol and mannitol; these esters must retain at least one free hydroxyl group. Preferred suitable hydroxylic esters are, for example, alkylene glycol monoacrylates, e.g ethylene glycol monoacrylate, propanediol monoacrylate and butanediol monoacrylate, and epoxide-acrylates obtained from glycidyl ethers of monohydric or polyhydric alcohols or phenols or from glycidyl esters of aliphatic, cycloaliphatic and aromatic monocarboxylic and polycarboxylic acids and from mono- or poly-epoxidized cycloaliphatic hydrocarbons. The reaction of these hydroxylic esters with vinyl isocyanate is carried out in the conventional manner, preferably in the presence of tin compounds as the catalyst and/or in the presence of inert solvents, and in general about equivalent amounts of isocyanate groups are reacted with the free hydroxyl groups of the hydroxylic ester. If, however, hydroxylic esters with more than one free hydroxyl group are reacted with vinyl isocyanate, it suffices in each case to react 1 mole of vinyl isocyanate with 1 mole of the hydroxylic ester. Vinylurethanes obtained from hydroxypropyl acrylate, hydroxybutyl acrylate, hydroxyethyl acrylate and low-viscosity epoxide acrylates, e.g. the adduct of 2 moles of acrylic acid with 1 mole of butanediol diglycidyl ether, are preferred.

The olefinically unsaturated compound (A), containing urethane groups, of the general formula

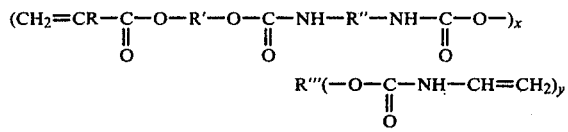

$$R'''(-O-C-NH-CH=CH_2)_y$$
$$\phantom{R'''(-O-}\|\phantom{-NH-CH=CH_2)_y}$$
$$\phantom{R'''(-O-}O$$

where x and y are identical or different and each is a number from 1 to 5, preferably from 1 to 3, R is hydrogen or methyl, R' is a divalent linear or branched radical of 2 to 16, preferably of 2 to 4, carbon atoms or a divalent cycloaliphatic radical of 5 to 12, preferably of 5 to 8, carbon atoms, R" is a divalent linear or branched aliphatic, cycloaliphatic or aromatic radical of 6 to 15 carbon atoms and R'" is a radical derived from a polyhydric alcohol, polyether-ol or polyester-ol and having a valency corresponding to the sum of x+y, are in general manufactured by first reacting a hydroxyalkyl acrylate or hydroxyalkyl methacrylate, e.g. the acrylic acid or methacrylic acid monoester of a linear or branched dihydric alcohol of 2 to 16 carbon atoms which may or may not contain oxa groups, e.g. ethylene glycol, propane-1,2-diol, propane-1,3-diol, butane-1,4-diol, butane-1,3-diol, butane-1,2-diol, pentane-1,5-diol, hexanediol, decanediol, diethylene glycol, triethylene glycol, tetraethylene glycol or cycloaliphatic dihydric alcohols of 5 to 12 carbon atoms, e.g. cyclohexane-1,1-diol, cyclohexane-1,2-diol, cyclohexane-1,3-diol, cyclohexane-1,4-diol, cyclohexanedimethanol or tricyclododecanedimethanol with diisocyanates of which the isocyanate groups are bonded to linear or branched aliphatic, cycloaliphatic or aromatic radicals of 6 to 15 carbon atoms, e.g. hexamethylene diisocyanate, 2,2,5-trimethylhexamethylene diisocyanate, toluylene diisocyanate, diphenylmethane diisocyanate, isophorone diisocyanate or dicyclohexylpropane diisocyanate, using a ratio of about 1 OH equivalent to 2 NCO equivalents, reacting the remaining isocyanate groups with from 10 to 90 equivalent percent of the hydroxyl groups of a polyol having a molecular weight of up to about 2,000, preferably <500, and reacting the remaining hydroxyl groups of this reaction product to the extent of from 10 to 100% with vinyl isocyanate.

Suitable polyols having a molecular weight of up to about 2,000, preferably <500, with which the reaction product of the hydroxyalkyl acrylate or hydroxyalkyl methacrylate and diisocyanate is reacted, are polyhydric alcohols, polyether-ols and polyester-ols with at least two, preferably from 3 to 6, free hydroxyl groups. Examples of suitable polyhydric alcohols are ethylene glycol, diethylene glycol, triethylene glycol, tetraethylene glycol, propylene glycol, dipropylene glycol, butane-1,2-diol, butane-1,3-diol or butane-1,4-diol, pentane-1,5-diol, neopentyl-glycol, trimethylolpropane, pentaerythritol, dipentaerythritol, mannitol, sorbitol and other hexitols, preferably trimethylolpropane, pentaerythritol and the neopentylglycol ester of hydroxypivalic acid. Examples of suitable polyether-ols are oxyethylation products or oxypropylation products of ethylene glycol, propylene glycol, trimethylolpropane, pentaerythritol, mannitol and sorbitol, and polytetrahydrofuran.

Examples of suitable polyester-ols are condensation products of adipic acid and ethylene glycol, adipic acid, ethylene glycol and butane-1,4-diol, adipic acid, phthalic acid, trimethylolpropane and propylene glycol, phthalic acid and trimethylolpropane, and phthalic acid and pentaerythritol.

Mixtures of the above compounds may also be used as the polyol. The reaction of the hydroxyalkyl acrylate or methacrylate with diisocyanate is carried out, as is the reaction of the resulting product with the polyol, in accordance with the conventional methods for the reaction of OH groups with isocyanate groups, such as are to be found, for example, in the book by Houben-Weyl, Methoden der organischen Chemie, Volume XIV/2, pages 57 et seq. (1963), advantageously in the presence of solvents and catalysts, at from 20° to 80° C.

The reaction of the reaction product of the hydroxyalkyl acrylate or methacrylate, diisocyanate and polyol with vinyl isocyanate is advantageously carried out in the presence of a catalyst and of a solvent or of a copolymerizable monomer, at from 20° to 100° C.

Particularly advantageous examples of olefinically unsaturated compounds (A) which contain urethane groups are reaction products of about 130 parts of hydroxypropyl acrylate or hydroxyethyl methacrylate with about 174 parts of toluylene diisocyanate or about 222 parts of isophorone diisocyanate, which are then reacted with from 378 to 3,400 parts of a saturated polyester obtained from adipic acid, phthalic acid, trimethylolpropane and propylene glycol (OH number 165 mg of KOH/g) or with from 157 to 1,433 parts of a branched polyether obtained from trimethylolpropane and propylene oxide (OH number 390 mg of KOH/g), and are finally reacted with from 7 to 621 parts of vinyl isocyanate.

The component (A) can be used as the sole binder. To achieve special effects, e.g. properties suitable for a specific use, it is in many cases advantageous to combine the vinylurethane with component (B).

(B) Suitable olefinically unsaturated compounds (B) copolymerizable with component (A) are, in particular, those which have a boiling point of above 50° C., preferably above 100° C. Lower-boiling compounds are in general less suitable, since they evaporate too easily after application of the coating composition, but before the latter has cured. This can alter the analysis of the coating composition and also lead to pollution of the environment by malodorous and, in some cases, toxic monomers. Compounds having a vapor pressure of less than about 10 mm Hg at 100° C. are therefore particularly preferred for finishes and printing inks which do not pollute the environment.

The molecular weight of component B can vary within wide limits from 70 to 20,000, i.e. both low molecular weight and high molecular weight compounds may be employed. Examples of suitable components B are:

1. Esters of unsaturated monocarboxylic acids or dicarboxylic acids, e.g. esters of acrylic acid, methacrylic acid, α-cyanoacrylic acid, crotonic acid, cinnamic acid, sorbic acid, maleic acid, fumaric acid or itaconic acid with aliphatic, cycloaliphatic or aromatic-aliphatic monohydric to tetrahydric alcohols of 3 to 20 carbon atoms, e.g. methyl acrylate and methacrylate, n-, i- and t-butyl acrylate and methacrylate, 2-ethylhexyl acrylate, lauryl acrylate, dihydroxydicyclopentadienyl acrylate and methacrylate, methylglycol acrylate, hydroxyethyl acrylate and methacrylate, hydroxypropyl acrylate and methacrylate, ethylene glycol diacrylate, diethyl glycol diacrylate, triethylene glycol diacrylate, neopentyl-glycol diacrylate and dimethacrylate, 1,4-dimethylolcyclohexane diacrylate, pentaerythritol triacrylate, tetraacrylate, trimethacrylate and tetramethacrylate, ethyl α-cyanoacrylate, ethyl crotonate, ethyl sorbate, diethyl maleate, diethyl fumarate and the diacrylate and dimethacrylate of oxyalkylated bisphenol A.

2. Amides of acrylic acid or methacrylic acid, which may or may not be substituted by alkyl, alkoxyalkyl or hydroxyalkyl at the nitrogen, e.g. N,N'-dimethylacrylamide, N-isobutylacrylamide, diacetone-acrylamide, N-methylolacrylamide, N-methoxymethylacrylamide, N-butoxymethylacrylamide, N-butoxymethylmethacrylamide and ethylene glycol bis-(N-methylolacrylamide) ether.

3. Vinyl esters of monocarboxylic acids or dicarboxylic acids of 2 to 20 carbon atoms, e.g. vinyl acetate, vinyl propionate, vinyl 2-ethylhexanoate, vinyl versatate, divinyl adipate and the like.

4. Vinyl ethers of monohydric or dihydric alcohols of 3 to 20 carbon atoms, e.g. isobutyl vinyl ether, hexyl vinyl ether, octadecyl vinyl ether, ethylene glycol divinyl ether, diethylene glycol divinyl ether, butanediol divinyl ether and hexanediol divinyl ether.

5. Mono-N-vinyl compounds, e.g N-vinylpyrrolidone, N-vinylpiperidone, N-vinylcaprolactam, N-vinylmorpholinone, N-vinyloxazolidone, N-vinylsuccinimide, N-methyl-N-vinylformamide, N-vinylcarbazole and divinylureas.

6. Styrene and its derivatives, e.g. α-methylstyrene, 4-chlorostyrene and 1,4-divinylbenzene.

7. Allyl ethers and allyl esters, e.g. trimethylolpropane diallyl ether, trimethylolpropane triallyl ether, pentaerythritol triallyl ether, diallyl maleate, diallyl fumarate and diallyl phthalate.

8. Unsaturated polyesters having a molecular weight of from 500 to 5,000 and containing from 0.5 to 10 double bonds per 1,000 molecular weight units, the polyesters being manufactured from, for example,
(a) from 10 to 70 percent by weight of α,β-unsaturated dicarboxylic acids, e.g. maleic acid, fumaric acid or itaconic acid,
(b) from 0 to 60 percent by weight of saturated aliphatic, cycloaliphatic or aromatic dicarboxylic acids, e.g succinic acid, adipic acid, tetrahydrophthalic acid, hexahydrophthalic acid, cyclohexane-1,4-dicarboxylic acid, phthalic acid, isophthalic acid or terephthalic acid,
(c) from 20 to 80 percent by weight of aliphatic, cycloaliphatic or non-phenolic aromatic diols, e.g. ethylene glycol, diethylene glycol, triethylene glycol, propane-1,2-diol, propane-1,3-diol, butane-1,2-diol, butane-1,3-diol, butane-1,4-diol, but-2-ene-1,4-diol, neopentyl-glycol, hexane-1,6-diol or oxyalkylated bisphenol A,
(d) from 0 to 5 percent by weight of tricarboxylic acids or tetracarboxylic acids, e.g. trimellitic acid, pyromellitic acid or benzenetetracarboxylic acid,
(e) from 0 to 10 percent by weight of monocarboxylic acids, e.g. acetic acid, propionic acid or benzoic acid,
(f) from 0 to 5 percent by weight of trifunctional or tetrafunctional alcohols, e.g. glycerol, trimethylolpropane or pentaerythritol, and
(g) from 0 to 10 percent by weight of monofunctional alcohols, e.g. methanol, ethanol, propanol or butanol.

9. Unsaturated epoxy resins which have been manufactured from, for example,
(a) monofunctional epoxides and acrylic acid or methacrylic acid, as described in U.S. Pat. No. 2,484,487,
(b) bifunctional epoxides and unsaturated fatty acids, as described in U.S. Pat. No. 2,456,408,
(c) polyfunctional aromatic epoxides and crotonic acid, as described in U.S. Pat. No. 2,575,440 or
(d) polyfunctional aromatic or aliphatic glycidyl ethers and acrylic acid and methacrylic acid, as described in U.S. Pat. No. 2,824,851.

10. Unsaturated polyurethanes obtained from hydroxyalkyl acrylates and diisocyanates, with or without polyols or polyamines, for example saturated unsaturated polyester-polyols, polyether-polyols or copolymer-polyols, as are described, for example, in German Laid-Open Application DOS No. 1,644,797 or, for printing ink purposes, in German Laid-Open Application DOS No. 2,358,948.

11. Unsaturated copolymers, for example manufactured by reacting
(a) copolymers, containing maleic anhydride groups, with unsaturated alcohols, for example as described in German Laid-Open Application DOS No. 2,050,893 or
(b) acrylic ester copolymers or polyesters, containing carboxylic acid groups, with olefinically unsaturated epoxides, e.g. glycidyl acrylate.

12. Butadiene polymers in which the double bonds are predominantly present as vinyl side groups.

13. Diallyl phthalate prepolymers.

14. Poly-N-vinylurethanes, manufactured, for example, as described in German Laid-Open Application DOS No. 2,064,701 by reacting vinyl isocyanate with saturated or unsaturated polyester-polyols, polyether-polyols or polyfunctional alcohols.

Mixtures of the various unsaturated compounds (B) can of course also be used.

Particularly preferred components (B) are acrylic monomers and N-vinyl monomers, unsaturated polyesters and epoxide-acrylates. Component (A) can be combined with up to 95, preferably with up to 70, percent by weight of component (B).

The coating composition of the invention may, depending on its intended use, also contain the relevant additives, for example:

1. from 0 to 70, preferably from 10 to 50, percent by weight of inorganic or organic pigments, e.g. carbon black, titanium dioxide, chalk, baryte, zinc white, lithopone, chromium yellow, yellow iron oxide or complex pigments, e.g. phthalocyanines, azo pigments, anthraquinone colorants and quinacridone pigments.

2. From 0 to 10, preferably from 0.001 to 3, percent by weight of dyes, e.g. eosin, crystal violet or malachite green.

3. From 0 to 10, preferably from 1 to 5, percent by weight of leveling agent, e.g. butyl acetate, butanol and silicones.

4. From 0 to 1, preferably from 0.001 to 0.5, percent by weight of inhibitors.

5. From 0 to 70, preferably from 10 to 50, percent by weight of fillers.

6. From 0 to 10, preferably from 1 to 5, percent by weight of diluents.

7. From 0 to 70, preferably from 10 to 50, percent by weight of inert synthetic resins, e.g. aminoplasts, alkyd resins or styrene/acrylate copolymers.

8. From 0 to 7, preferably from 0.5 to 5, percent by weight of waxes.

9. From 0 to 5, preferably from 0.2 to 5, percent by weight of thixotropic agents.

The coating compositions of the invention are cured by copolymerization of components A and B. This may be effected thermally, by direct heating, by means of infrared radiation or with the aid of initiators, but preferably by using high energy radiation.

For the thermal polymerization, temperatures of from 20° to 200° C. are employed; the conventional initiators, e.g. organic peroxides or azo compounds, and accelerators, e.g. cobalt salts, may be added in amounts of from 0.5 to 6 percent by weight.

Radiation curing may be effected with UV rays or by electron beams. In the former case, conventional photoinitiators, such as are described, for example, by B. J. Kosar in "Light Sensitive Systems", Wiley, 1965, pages 158–193, are added. Preferably, the following are used: Benzoin, benzoin ethers, diacetyl, benzil, benzil monoketals, benzophenone, Michler's ketone, xanthones, anthraquinones, sulfur compounds, e.g. disulfides, thiols and dithiocarbamates, and carbonyl compounds. e.g. triphenylphosphine-iron tetracarbonyl in conjunction with chlorine donors, each in amounts of from 1 to 3 percent by weight. Details of the method of curing by UV radiation are to be found in "Photopolymerization" by H. Barzynski, K. Penzien and O. Volkert in Chemiker-Zeitung 96 (1972), 545–551, and in German Laid-Open Application DOS No. 2,251,933. Electron beam curing is described in detail in German Laid-Open Application DOS No. 2,049,715 cited above, in which further details regarding advantageous coating thickness, radiation doses and irradiation times may also be found.

The coating compositions of the invention may be used for the production of coatings and finishes on metals, wood, plastic, leather and paper. These coatings may be used as protective layers or for decorative purposes.

The coating compositions may also be used as a photopolymer layer for print carriers, e.g. relief print plates or planographic print plates, or for photoresists. In such cases, they are cured by image-wise irradiation of the coated carrier; no curing occurs in the unexposed zones and these parts of the layer are dissolved out again.

Finally, the coating compositions may also be used for the manufacture of UV-curing printing inks and print pastes. Using such inks and pastes, substrates, e.g. paper, metals or plastic films, are printed with the pigment-containing binders in order to apply a layer from about 0.5 to 5 $\mu$m thick. The binders cure very rapidly on ultaviolet irradiation and the ink becomes fixed to the substrate. The printing inks manufactured using the coating compositions of the invention are distinguished by extremely rapid drying even if only 1 or 2 ultraviolet lamps are used in the case of four-color printing, and by very high printing speeds. The drying prints have very good scuff resistance. This resistance is much improved over conventional ultraviolet printing inks in the case of colors which are, from this point of view, particularly critical in ultraviolet printing, e.g. blue and black. These remarks apply particularly to prints produced at maximum print speeds and hence with minimum irradiation times.

If no pigments are added, the binders may be used as over-printing varnishes.

It is particularly advantageous to use the coating compositions according to the invention for printing inks and overprinting finishes.

In the Examples, parts and percentages are by weight.

EXAMPLE 1

148 parts of butanediol monoacrylate are dissolved in 200 parts of ethyl acetate. 0.08 part of dibutyl-tin dilaurate is added and 69 parts of vinyl isocyanate are then added dropwise at from 50° to 60° C., whilst stirring. The reaction is then allowed to continue for from 1 to 2 hours, until the isocyanate content has fallen to below 0.1%. 0.2 part of hydroquinone methyl ether is then added and the solvent is stripped off under reduced pressure. A pale greenish yellow liquid is obtained in virtually quantitative yield.

A solution is prepared from the following components: 64 parts of an adduct of 2 moles of acrylic acid with 1 mole of bisphenol A diglycidyl ether (double bond vlue 0.38 equivalent/100 g), 16 parts of butane-1,4-diol diacrylate and 20 parts of the above reaction product.

This solution is knife-coated as a layer 60 $\mu$m thick onto surface-filled chipboard and is cured with 320 KV electrons at a belt speed of 80 m/minute, corresponding to a radiation dose of 0.875 Mrad. A scratch-resistant, tack-free coating of great hardness (König pendulum hardness 200 seconds) is obtained.

EXAMPLE 2

A reaction product of technical-grade butane-1,4-diol diglycidyl ether (epoxide equivalent weight 151) and the equivalent amount of acrylic acid is reacted with the equivalent amount of vinyl isocyanate as described in Example 1 to give the corresponding vinylurethane, which is applied onto paper as a layer 20 $\mu$m thick, and is cured. A tack-free, very glossy coating is obtained.

EXAMPLE 3

130 parts of hydroxypropyl acrylate are added dropwise to a solution of 174 parts of toluylene diisocyanate in 400 parts of ethyl acetate in a stirred vessel at from 50° to 60° C. As soon as the isocyanate value of the mixture has fallen to 5.9–6.0%, 680 parts of a polyester obtained from adipic acid, phthalic acid, trimethylolpropane and propane glycol (OH number 165 mg of KOH/g) are run in and 0.5 part of dibutyl-tin dilaurate is added. During the addition and the subsequent reaction the temperature is kept at from 50° to 60° C. When the isocyanate value has fallen to below 0.1%, 69 parts of vinyl isocyanate are added dropwise, again at from 50° to 60° C., and the batch is allowed to contnue to react at this temperature until the isocyanate value has again fallen to below 0.1%. 1.1 parts of hydroquinone monomethyl ether are then added.

The solvent is removed from the reaction product under reduced pressure. The solvent-free resin is diluted with a mixture of equal parts of trimethylolpropane triacrylate and ethyldiglycol acrylate. The resin solution has the following composition: 50% of acrylicvinylurethane, 25% of trimethylolpropane triacrylate and 25% of ethyldiglycol acrylate.

60 $\mu$m thick layers are coated onto blackplate by means of a film spreader and are cured with 320 KV electrons at a belt speed of 70 m/min, corresponding to a radiation dose of 1 Mrad. The cured coating film adheres well to the substrate and is tack-free and scratch-resistant.

COMPARATIVE EXAMPLE 340 parts of a polyester obtained from adipic acid, phthalic acid, trimethylolpropane and propylene glycol (OH number 165 mg of KOH/g) are dissolved in 200 g of ethyl acetate in a stirred vessel at from 50° to 60° C., and 0.25 part of dibutyl-tin dilaurate is added. 69 parts of vinyl isocyanate are added dropwise whilst keeping the temperature constant and the reaction is allowed to continue until the isocyanate value has fallen to below 0.1%. 0.4 part of hydroquinone monomethyl ether is added and the solvent is removed under reduced pressure.

The solvent-free resin is dissolved in a mixture of equal parts of trimethylolpropane triacrylate and ethyldiglycol acrylate. The solution has the following composition:

50% of vinylurethane, 25% of trimethylolpropane triacrylate and 25% of ethyldiglycol acrylate.

A 60 μm thick layer of the resin solution is coated onto black-plate by means of a film spreader and is cured with 320 KV electrons at a belt speed of 40 or 70 m/min, corresponding respectively to a dose of 1.75 or 1.0 Mrad. The film cured with 1.75 Mrad is tack-free and scratch-resistant, whilst the film cured with 1.0 Mrad is not scratch-resistant and is slightly tacky.

We claim:

1. A radiation-curable binder for coating compositions which binder comprises one or more olefinically unsaturated compounds of the general formula (I)

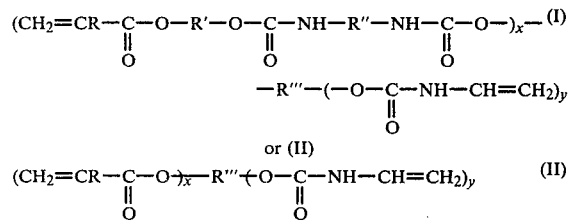

where x and y may be identical or different and each is a number from 1 to 5, R is hydrogen or methyl, R' is a divalent linear or branched radical of 2 to 16 carbon atoms which may or may not contain oxa groups, or is a divalent cycloaliphatic radical of 5 to 12 carbon atoms, R" is a divalent linear or branched aliphatic, cycloaliphatic or aromatic radical of 6 to 15 carbon atoms and R'" is a radical which is derived from a polyhydric alcohol, a polyether-ol or a polyester-ol and which has a valency corresponding to the sum of x+y, with or without additional other radiation-curable olefinically unsaturated compounds having acrylyl radicals.

2. The binder of claim 1, wherein R'" is derived from a polyester-ol.

3. The binder of claim 1, wherein R'" is derived from a polyether-ol.

4. The binder of claim 1, wherein R'" is derived from a polyhydric alcohol.

5. The binder of claim 2, 3 or 4, wherein said additional other radiation-curable olefinically unsaturated compounds have molecular weights of from 70 to 20,000 and boiling points above 50° C.

6. The binder of claim 2, 3 or 4, wherein said additional other radiation-curable olefinically unsaturated compounds are one or more materials selected from the group consisting of esters of unsaturated monocarboxylic or dicarboxylic acids with aliphatic, cycloaliphatic or aromatic-aliphatic monohydric to tetrahydric alcohols of 3 to 20 carbon atoms, amides of acrylic acid or methacrylic acid, which may or may not be substituted by alkyl, alkoxyalkyl or hydroxyalkyl at the nitrogen, unsaturated polyesters having a molecular weight of from 500 to 5,000 and containing from 0.5 to 10 double bonds per 1,000 molecular weight units, unsaturated epoxy resins, unsaturated polyurethanes obtained from hydroxyalkyl acrylates, diisocyanates and polyols or polyamines, reaction products or copolymers, containing maleic anhydride groups, with unsaturated alcohols, and reaction products of acrylic ester copolymers or polyesters containing carboxylic acid groups, with olefinically unsaturated epoxides.

7. The binder of claim 2, which is the reaction product of vinyl isocyanate with a compound selected from the group consisting of hydroxypropyl acrylate, hydroxybutyl acrylate, hydroxyethyl acrylate and the adduct of 2 moles of acrylic acid with 1 mole of butanediol diglycidyl ether.

8. The binder of claim 5, wherein the total composition contains up to 95% by weight of said additional other radiation-curable olefinically unsaturated compounds.

9. The binder of claim 5, wherein the total composition contains up to 70% by weight of said additional other radiation-curable olefinically unsaturated compounds.

* * * * *